United States Patent [19]

Moore

[11] Patent Number: 4,857,631

[45] Date of Patent: Aug. 15, 1989

[54] METHOD FOR PRODUCING DE-WATERED GRAFTED RUBBER CONCENTRATE

[75] Inventor: Eugene R. Moore, Midland, Mich.

[73] Assignee: The Dow Chemical Company, Midland, Mich.

[21] Appl. No.: 117,265

[22] Filed: Nov. 6, 1987

Related U.S. Application Data

[63] Continuation-in-part of Ser. No. 720,333, Apr. 5, 1985, abandoned.

[51] Int. Cl.$^4$ .............. C08F 6/22; C08L 9/04; C08L 9/10

[52] U.S. Cl. .................. 528/481; 528/502; 525/70; 525/86; 525/197; 525/242; 525/243; 525/313; 525/314

[58] Field of Search ............ 528/481, 936, 939; 523/335; 525/243, 242, 70, 86, 313, 314, 197

[56] References Cited

U.S. PATENT DOCUMENTS

| | | | |
|---|---|---|---|
| 2,396,907 | 3/1946 | Wolk et al. | 528/936 X |
| 3,296,178 | 1/1967 | Sutherland, Jr. | 523/335 X |
| 4,401,806 | 8/1983 | Hagiwara et al. | 528/498 |

FOREIGN PATENT DOCUMENTS 0961588  1/1975  Canada ................ 525/197

OTHER PUBLICATIONS

Williams, Emulsion Polymerization, Polymer Processes Schildznecht (ed.) Interscience, N.Y. (1956) pp. 134, 149.

Burlant et al., Block and Graft Copolymers, Reinhold Pub. Corp., N.Y. (1960) p. 14.

Hackh's Chem. Dict., J. Grant (ed.), McGraw-Hill (N.Y.), p. 624 (1969).

*Primary Examiner*—Joseph L. Schofer
*Assistant Examiner*—F. M. Teskin
*Attorney, Agent, or Firm*—Price, Heneveld, Cooper, DeWitt & Litton

[57] ABSTRACT

The specification discloses a readily de-waterable modified rubber concentrate and method for forming same from a process including the preparation of a latex emulsion of the modified rubber concentrate, insuring that the emulsified modified rubber concentrate has a rubber content of from about 57 to about 88% by weight and freeze coagulating the modified rubber concentrate from the emulsion.

12 Claims, 1 Drawing Sheet

NOTE* POINT BASED ON WATER AFTER PRESSING, SINCE WATER REMAINING AFTER CENTRIFUGING WAS MUCH HIGHER AND OUT OF RANGE.

METHOD FOR PRODUCING DE-WATERED GRAFTED RUBBER CONCENTRATE

CROSS-REFERENCE TO RELATED APPLICATION

This application is a continuation-in-part of U.S. patent application Ser. No. 720,333, filed April 5, 1985 and entitled DE-WATERABLE GRAFTED RUBBER CONCENTRATE AND METHOD FOR PRODUCING SAME, now abandoned upon the filing of this application.

BACKGROUND OF THE INVENTION

The present invention relates to modified rubber concentrates formed (at least in part) through emulsion polymerization or emulsion blending. Grafted rubber concentrates are one type of modified rubber concentrate. They are typically formed by emulsion polymerization, where a monomer is, or monomers are, grafted through polymerization onto colloidally suspended rubber particles.

The thus polymerized particles are then coagulated. Chemical or shear coagulation are the typical commercially used coagulation techniques. The coagulated polymer particles are separated from the emulsion carrier by pressing, centrifuging or the like. A rinse step may be employed to rinse the coagulated polymer.

Another type of modified rubber concentrate is formed by blending emulsions of rubbers and graft rubber compounds. Again, coagulation must be effected and the resulting coagulated polymer blend de-watered.

In either case, de-watering is typically a problem. Normal 40 to 50% rubber ABS emulsion, when freeze coagulated, produces a fine powder which is extremely difficult to de-water. Pure rubber emulsions when coagulated produce a sponge-like structure which is extremely difficult to de-water.

These de-watering difficulties are encountered over a wide range of emulsion polymerized or blended modified rubber concentrates regardless of the de-watering technique used (centrifuging or mechanical pressing being typical). As a result, energy has to be expended to further dry the rubber concentrate before it can be used.

U.S. Pat. No. 4,401,806 to Hagiwara et al. entitled PROCESS FOR PRODUCING GRAFT COPOLYMER discloses a method for improving the powder characteristics of graft copolymers by mixing the copolymer latex with a particular organic solvent immediately after or simultaneously with the coagulation of the latex, while maintaining a dispersion in which water forms a continuous phase. The problem with this approach is that one has to then separate the organic solvent from the end product rubber as well as separating water from the end product rubber. A steam stripping step or the like would have to be used to insure that all solvent is removed. These rubbers are commonly used to reinforce styrene, which is used in refrigerators and in food packaging. One does not want solvent to be migrating out of the plastic.

SUMMARY OF THE INVENTION

In the method of the present invention, a readily de-waterable modified rubber concentrate is formed in a process involving the creation of a rubber concentrate emulsion, in which the rubber concentration as a percentage of the emulsified polymer is from about 57 to about 88%, followed by freeze coagulating said modified rubber concentrate polymer. Organic solvents are not used in the present invention either during the coagulation step or at any time after the coagulation step prior to de-watering. The resulting modified rubber concentrate can be readily de-watered using any conventional de-watering technique, as for example pressing or centrifuging. The resulting product of this invention is free-flowing and non or low dusting, rather than spongy or crumbling and dusting.

Experimental results indicate that far less water remains in the coagulant following de-watering than is the case with conventionally produced modified rubber concentrates, which typically have less than 50% rubber and/or are shear or chemically coagulated. These results are particularly surprising in view of industry experience which suggests that increasing the percentage of rubber increases the difficulty of de-watering.

DESCRIPTION OF THE PREFERRED EMBODIMENT

Figure 1:
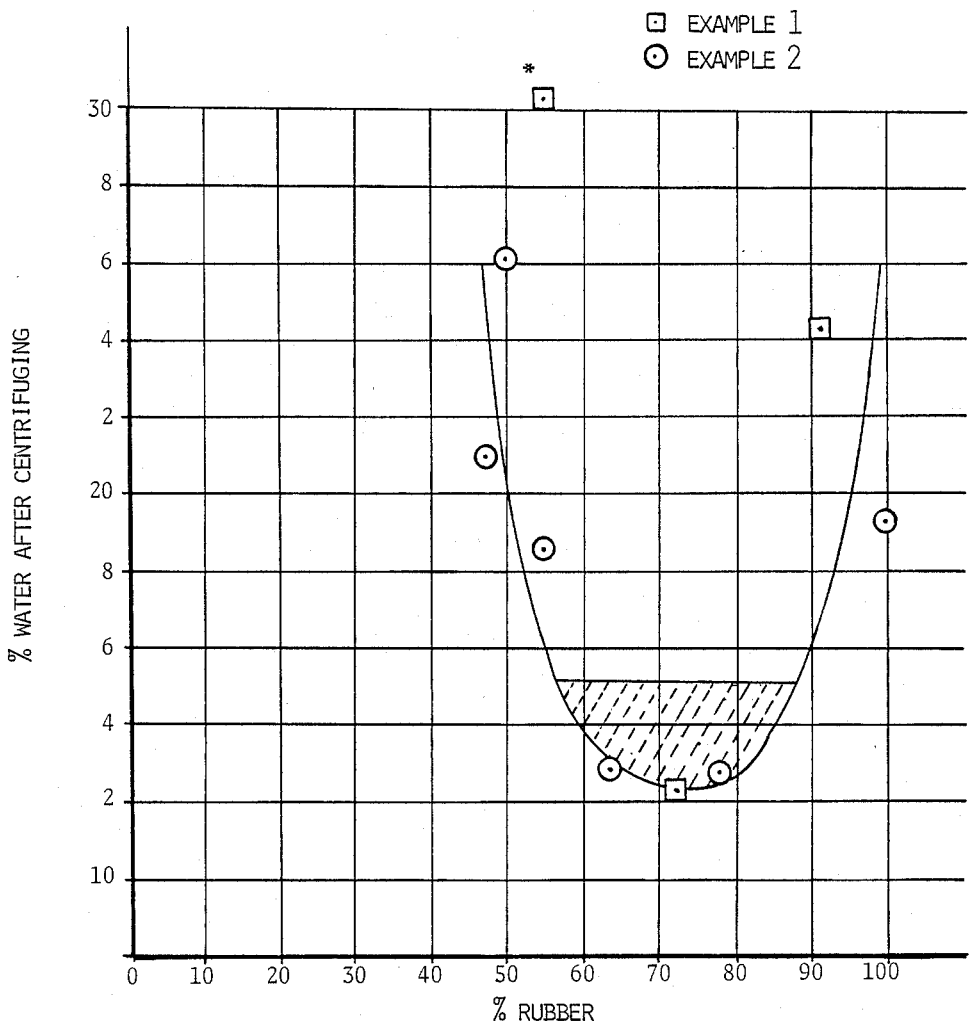
FIG. 1 is a graph of the percentage of water remaining in the coagulated rubber concentrate after centrifuging, charted against the percentage of rubber in the concentrate.

In the broadest aspects of the invention, the preferred embodiment modified rubber concentrate of the present invention can be formed by graft polymerization, emulsion polymer blending or some combination thereof. The invention is significant only in the context of a modified rubber concentrate which is formed in a process involving the creation of a rubber concentrate emulsion, since it is the coagulant of such emulsions which is typically so difficult to de-water.

The most common use of the invention will typically be in the creation of graft rubber concentrates through emulsion polymerization, where a key step is insuring that the rubber content of the concentrate is from about 57 to about 88%. However, the blending of different emulsions in such a way as to yield a rubber content of from about 57 to about 88% is within the broadest scope of the invention. The percentage range of 57 to 88% refers to the content of the rubber as a percentage of the polymer composition, and not to the rubber content of the emulsion.

A more preferred rubber content range is from about 64 to about 80% by weight. This encompasses the flatter portion of the curve of FIG. 1 and allows the product to be de-watered to below about 13% by centrifuging.

The term "rubber" as used herein refers to an elastomer with a glass transition temperature below about 0° C. Preferably, the glass transition temperature is not higher than about −20° C. The glass transition temperature is the temperature at which an elastomer loses its elasticity and becomes rigid and brittle. The glass transition temperature should be determined in accordance with ASTM test method D-746-52T.

The most common rubbers which will be used in the present invention are random polymers or copolymers of conjugated 1-3 dienes. Examples include butadiene, isoprene and chloroprene.

Ionically polymerized rubbers, such as block copolymers of styrene and butadiene, can also be used in the present invention. Other rubbers such as polybutyl acrylate, ethylene propylene diene modified rubbers and the like may also be utilized.

Of course, the rubber used must be one which can be emulsified. Conventional emulsification and/or emulsion polymerization techniques can be employed. Any of the conventional emulsifiers can be used, e.g., anionic emulsifiers, cationic emulsifiers, amphoteric emulsifiers and nonionic emulsifiers. In some cases, the rubber may have to be dissolved in a solvent first, then mixed with suitable emulsifiers and water. Following vigorous agitation, the solvent is distilled off through steam distillation or the like. These techniques are well-known to those skilled in the art and the particular manner in which the emulsion is created is not critical.

In the operation of the present invention, freeze coagulation is employed in order to cause particulation of the latex solids. Shear coagulation and chemical coagulation of 57 to 88% rubber polymer emulsions have not been found to result in the readily de-waterable polymers of the present invention.

In freeze coagulation, the temperature of the emulsion is reduced until it freezes. Upon subsequent thawing, the polymer has coagulated and can be separated from the emulsion carrier, which is basically an emulsifier-water solution.

Most preferably, the freeze coagulation is conducted in accordance with another of my inventions, which is described in my copending United States patent entitled FREEZE COAGULATION PROCESS. Basically, the freezing surface of the freezing vessel, or insert in the case of introduction of refrigerated plates or the like into the latex, is first coated with a thin film of ice. The latex is then exposed to the ice coated freezing surface and polymeric material is allowed to coagulate on the coated, freezing surface. The coagulated product can readily be removed from the freezing surface, most preferably by warming the freezing surface to cause the ice layer to melt and thereby allowing the coagulated product to fall away from the freezing surface.

A variety of different types of equipment can be used to practice the present invention. With modification, conventional ice making equipment can be used. In a flat plate freeze apparatus, the freezing surface is defined by a plurality of hollow plates having a refrigerant circulating therethrough. One company from which such plate freezing equipment is available is Turbo Refrigerating Company of Denton, Texas. This must be modified by the addition of a latex tank with a hinged bottom door. The latex emulsion is maintained in a freeze tank into which the plates can be dipped and removed. The tank preferably includes an open top and a hinged bottom which can be opened to allow frozen, coagulated polymeric material to fall from the tank by gravity.

In operation, refrigerant is passed through the plates until they become chilled. A thin layer of water is then frozen on the plate surfaces either by spraying plates with water or alternatively by dipping them very briefly into a tank of water.

Once coated with a thin layer of ice, the freezing plates are dipped into the latex emulsion in the tank. They are left in the emulsion until the polymer layer on the freezing surface has become so thick that the rate of additional coagulation begins to slow down.

At that point, any liquid remaining in the tank is pumped out. Preferably, the spacing between the plates and the walls of the tank is such that little liquid removal is necessary, i.e., the latex in the tank is mostly frozen.

The flow of refrigerant through the plates is stopped. Preferably, hot, compressed, refrigerant gas or equivalent is circulated through the plates to accelerate melting of the ice layer on the freezing surfaces. The frozen mixture of emulsion carrier and coagulated polymer falls away from the freezing plate as the ice layer melts. The trap door is opened so the frozen mixture falls out of the tank and into a container in which it is allowed to thaw. The frozen coagulum is then thawed and de-watered in a conventional manner. This can be done by mechanically pressing the coagulum in a filtering mechanism so as to force the water associated with the coagulant through the filter medium. A centrifuge may also be used.

Another type of ice freezing equipment referred to is a vertical tube bundle device. Such equipment is available, for example, from Henry Vogt Machine Company of Louisville, Kentucky. It comprises basically a plurality of hollow freezer tubes positioned within a jacket or tank. Refrigerant is circulated within the jacket around the freezer pipes. The actual freezing surface comprises the interior of freezing pipes. The apparatus must be modified to include a hinged bottom door for closing the hollow tubes, to allow latex to be held therein rather than simply circulated therethrough.

The freezer tubes are first filled with water with bottom door closed in order to freeze a thin layer of ice on the interior freezing surfaces of tubes. The water is then pumped out or allowed to drain out by opening the bottom. The freezer pipes are then refilled with latex which is allowed to freeze until such time as the polymer layer on the freezing surface of each tube has become so thick that the rate of additional coagulation begins to slow down. Preferably, the apparatus is designed such that most of the latex within a tube will have been frozen as a result of such freezing.

Then, heat is applied outside the tubes to melt the thin ice layer. The bottom door is opened and the long rods or hollow cylinders of coagulated polymer are allowed to fall into a device where thawing may be completed. Water is then separated from the polymer by pressing or centrifuging.

A third alternative freezing apparatus is the continuous belt-type and is also commercially available for conventional ice freezing. One such system which can be modified for use in the present invention is available from Sandvik Conveyor, Inc. of Fair Lawn, New Jersey. The freezing surface is defined by a segmented steel belt which is divided into hingedly connected tray segments, each having a plurality of individual cube defining recesses. The belt is carried over a freezing bath where the freezing surface is first sprayed with water. As the belt moves across the freezing bath, a fine film of ice is formed. The depressions in each belt segment are then filled with latex and the latex freezes as the belt continues to pass over the freezing bath.

The belt is conveyed around an end roller past a steam station which faces the inside surface of the belt on its bottom course. The heat applied at steam station thaws the ice layer between the freezing surface and the frozen latex and causes the frozen latex to fall into a receiving station. It is then allowed to thaw and is de-watered in the manner described above.

Conventional de-watering methods can be used to de-water the coagulant. Centrifuging or mechanical pressing are typically employed commercially.

By practicing the present invention, one can, using conventional de-watering techniques, reduce the water level of the coagulated polymer to below about 15%. Water levels below about 15% are particularly desirable because the polymer can be directly fed into a blending extruder where the rubber concentrate is blended with other polymers. With higher water levels, a very energy intensive drying operation must be used to lower the moisture level.

Where drying at elevated temperatures is desired, it is advantageously found that the inverted materials with about 57 to 88% rubber are much less prone to forming dangerous, combustible dust. The rate of freezing also will have some influence on the ease of de-watering and dust formation. More rapid freezing will generally produce a finer product with more tendency to produce dust. Increasing the rate of freezing has been found to result in a finished product having a higher percentage of retained water for rubber contents below about 64%. The reverse has been observed in products having rubber contents above about 75%.

The product of this invention is free-flowing and granular in appearance and feel. This is especially true within the more preferred range of 64 to 80% rubber content. The product is nondusting, especially above the more preferred 64% lower limit. It is not sponge-like, especially below the more preferred upper limit of 80%. These are highly desirable but unusual properties for rubber concentrates.

Experimental Results

To illustrate the invention, various modified rubber concentrates were prepared through emulsion polymerization using both mono disperse and poly disperse rubbers. The rubber concentrate of the various modified rubber concentrates was varied over a broad range in order to define the limits of operability of the present invention.

In Example 1, three emulsion graft rubber concentrates which were essentially mono disperse in particle size were freeze coagulated slowly, then de-watered (following thawing) for five minutes in either a porous basket batch centrifuge with a cloth liner, or by wrapping in several layers of towel and subjected to a hydraulic press. The results obtained are set forth below in Table 1:

| Sample | Latex Size A | % Rubber | % Water Centrifuged | % Water Pressed | Appearance |
|---|---|---|---|---|---|
| 1. | 1183 | 90.9 | 24.3 | 18.0 | sponge-like |
| 2. | 1262 | 71.4 | 12.1 | 6.8 | nondusting free-flowing |
| 3. | 1371 | 55.6 | 53.7 | 32.5 | fragile dusting crumb |

It can be seen that the modified rubber sample 2 having a rubber content of approximately 71.4% was centrifuged to a water content of 12.1% and was pressed to a water content of 6.8%. In contrast samples 1 and 3 which were either above or below the rubber content range of 57 to 88% could not be de-watered to below 15% by either centrifuging or pressing.

In Example 2, samples 4–9 were prepared in a similar manner to those of Example 1, except that the samples were prepared from poly disperse rubbers. Also in Example 2, the only water separation technique used was centrifuging. The results are indicated in Table 2 below:

| Sample | % Rubber | % H$_2$O (centrifuge) | Appearance |
|---|---|---|---|
| 4. | 77.2 | 12.6 | nondusting |
| 5. | 53.0 | 18.5 | dusty crumb |
| 6. | 49.0 | 26.2 | dusty crumb |
| 7. | 47.0 | 20.9 | dusty crumb |
| 8. | 64.0 | 12.7 | nondusting flake |
| 9. | 100.0 | 19.1 | spongy, rubbery |

As in Example 1, the samples falling within the range of the present invention, i.e., samples 4 and 8 were both mechanically de-watered using a centrifuge to less than about 15% water. None of the other samples could be de-watered to that extent and would require further drying to achieve the desired water content of less than 15%.

The results of Examples 1 and 2 were plotted in FIG. 1. A horizontal line was drawn at the 15% water level. The points at which it intercepts the experimental results curve constitute the upper and lower limits of rubber content which are operable in the present invention. Thus, the rubber content of the emulsified modified rubber concentrate polymer must be between about 57 and about 88% by weight. All percentages referred to herein are percentages by weight unless otherwise specifically indicated.

MANNER OF PREPARATION OF THE SAMPLES

Rubber Substrate Of Examples 1–3

Samples 1–3 of Example 1 are based on the same graftable rubber substrate. The graftable rubber substrate employed was prepared in the following manner:

A 200 gallon glass-lined jacketed reactor equipped with stirrer was charged with 445.39 kilograms of deionized water, 1332.97 grams of a 43% solution of sodium dodecylbenzenesulfonate, 318.13 grams of sodium bicarbonate, and 203.60 grams of a 46% solution of ethylene diamine tetraacetic acid. The sodium dodecylbenzenesulfonate is of course a surfactant necessary to keep the polymers in emulsion. Sodium bicarbonate is added as a pH controller. The ethylene diamine tetraacetic acid is a chelating agent which ties up any contaminating minerals which may be in the water, even though it has been demineralized, or which may come off the reactor. The reactor was sealed and tested for leaks at 30° C. The reactor was purged of oxygen by pressurizing with nitrogen to about 60 psig and then evacuating the nitrogen to a vacuum of about 150 millimeters of mercury. The process of pressurizing the reactor with nitrogen and evacuating was performed a total of three times.

After purging the reactor of oxygen, 4.63 kilograms of acrylonitrile were added to the reactor. Immediately after the addition of the acrylonitrile, 47.86 kilograms of a monomer mixture were added to the reactor. The monomer mixture comprised 4.9 parts styrene, 0.3 parts normal octyl mercaptan, 2.1 parts acrylonitrile, and 93 parts butadiene. To the reactor was then added an initiator shot comprising 636.26 grams of sodium persulfate dissolved in 636.26 grams of deionized water, followed by an additional 8.9 kilograms of deionized water.

The temperature of the reactor was increased to approximately 65° C. over a period of about one-half hour.

A pressure drop of about 10 psi indicated initiation of the polymerization reaction. At this time, 271.45 kilograms of the monomer mixture described above were continuously added to the reactor at a rate of about 54.29 kilograms per hour. At the same time the monomer mixture was being continuously added to the reactor, an aqueous mixture was being added to the reactor at a rate of about 13.07 kilograms per hour until 78.42 kilograms of the aqueous mixture had been added to the reactor. The aqueous mixture comprised 74.67 kilograms of deionized water and 17.36 kilograms of a 43% solution of sodium dodecylbenzenesulfonate.

The reaction was allowed to continue until the pressure within the reactor decreased to about 20 psig. At this time, the contents of the reactor were steam stripped to remove the unreacted monomer.

Sample Number 1

The latex of graftable rubber substrate produced in the above described manner was then grafted. To a 200 gallon glass-lined reactor was added 787.19 kilograms of the graftable rubber substrate latex produced above. The latex of graftable rubber substrate had a solids content of 39.1% by weight. A solution of 100 grams of sodium persulfate and 500 grams of deionized water was added to the rector with the latex of graftable rubber substrate. The reactor was pressurized to 10 psig with nitrogen and heated to about 70° C.

To the reactor was then added 12.35 kilograms of a first monomer feed stream. The first monomer feed stream comprised 69.25 weight percent styrene, 30.75 weight percent acrylonitrile, based on total weight of the first monomer feed stream, and 0.014 parts per one hundred parts monomer of normal octyl mercaptan. The first monomer feed stream was continuously added to the reactor at a rate of about 61.77 kilograms per hour. At the same time the first monomer feed stream was being continuously added to the reactor, an aqueous feed stream was being added to the reactor at a rate of about 68.7 kilograms per hour until 13.74 kilograms of the aqueous feed stream had been added. The aqueous feed stream comprised 13.42 kilograms deionized water, 0.012 kilograms of sodium persulfate, and 0.308 kilograms of a 43% solution of sodium dodecylbenzenesulfonate.

After the first monomer feed stream and aqueous feed stream had been added to the reactor, the reaction was allowed to continue for one hour at 70° C. At this time, 169.65 kilograms of the latex contained in the reactor was removed from the reactor.

To the material remaining in the reactor, after the removal of the 169.65 kilograms of latex, was added a second monomer feed stream. The second monomer feed stream comprised 69.25 weight percent styrene, 30.75 weight percent acrylonitrile, based on a total monomer weight of the second monomer feed stream, and 0.021 parts per hundred parts monomer of normal octyl mercaptan. The second monomer feed stream was added to the reactor at a rate of about 48.85 kilograms per hour until a total of 14.66 kilograms of the second monomer feed stream had been added.

At the same time the second monomer feed stream was being continuously added to the reactor, a second aqueous feed stream was being added to the reactor. The second aqueous feed stream was added to the reactor at a rate of about 54.33 kilograms per hour until a total of 16.30 kilograms of the second aqueous feed stream had been added.

After the second monomer feed stream and the second aqueous feed stream had been added to the reactor the reaction was allowed to continue for one hour at a temperature of about 70° C. At this time, 146.51 kilograms of the latex contained in the reactor was removed from the reactor. The latex removed from the reactor was steam stripped of residual monomers and stabilized. This latex was found to have grafted thereto about $1.22 \times 10^{-7}$ grams of superstrate per square centimeter of substrate surface.

This material comprises sample number 1. The core rubber content of sample 1 is approximately 90.9%.

Sample 2

To the material remaining in the reactor, after the removal of sample 1 (the 146.51 kilograms of latex), was added a third monomer feed stream. The third monomer feed stream comprised 69.25 weight percent styrene, 30.75 weight percent acrylonitrile, based on total weight of the third monomer feed stream, and 0.105 parts per hundred parts monomer of normal octyl mercaptan. The third monomer feed stream was added to the reactor at a rate of about 38.92 kilograms per hour until a total of 57.43 kilograms had been added.

At the same time the third monomer feed stream was being continuously added to the reactor, a third aqueous feed stream was being added to the reactor. The third aqueous feed stream was added to the reactor at a rate of about 42.69 kilograms per hour until 64.03 kilograms had been added. The third aqueous feed stream comprised 62.54 kilograms of deionized water, 0.057 kilograms of sodium persulfate, and 1.433 kilograms of a 43% aqueous solution of sodium dodecylbenzenesulfonate.

After the addition of the third monomer feed stream and the third aqueous feed stream the reaction was allowed to continue for one hour at a temperature of 70° C. After one hour 186.43 kilograms of the material in the reactor was removed from the reactor. The latex removed from the reactor was steam stripped of residual monomers and stabilized. This latex was found to have grafted thereto about $5.57 \times 10^{-7}$ grams of superstrate per square centimeter of substrate surface.

This removed latex comprises sample number 2. It has a core rubber content of approximately 71.4%.

Sample 3

To the material remaining in the reactor, after the removal of sample 2 (the 186.43 kilograms of latex), was added a fourth monomer feed stream. The fourth monomer feed stream comprised 69.25 weight percent styrene, 30.75 weight percent acrylonitrile, based on total weight of the fourth monomer feed stream, and 0.14 parts per hundred parts monomer of normal octyl mercaptan. The fourth monomer feed stream was added to the reactor at a rate of about 18.42 kilograms per hour until a total of 55.26 kilograms had been added.

At the same time the fourth monomer feed stream was being continuously added to the reactor, a fourth aqueous feed stream was added to the reactor at a rate of about 20.48 kilograms per hour until 61.44 kilograms had been added. The fourth aqueous feed stream comprised 60.0 kilograms of deionized water, 0.055 kilograms of sodium persulfate, and 1.38 kilograms of a 43% aqueous solution of sodium dodecylbenzenesulfonate.

After the addition of the fourth monomer feed stream and the fourth aqueous feed stream the reaction was allowed to continue for one hour at a temperature of 70° C. After one hour 326.59 kilograms of the material present in the reactor was removed from the reactor. The latex removed from the reactor was steam stripped of residual monomers and stabilized. This latex was found to have grafted thereto about $11.7 \times 10^{-7}$ grams of superstrate per square centimeter of substrate surface.

This latex constitutes sample 3. It has a core rubber content of approximately 55.6%.

Rubber Substrate of Samples 4–8

The rubber substrate used in samples 4–8 was in each case prepared as follows:

A 200 gallon glass-lined jacketed reactor was charged with 230 kilograms of deionized water, 623.2 grams of a 43% solution of sodium dodecylbenzenesulfonate, 148.7 grams sodium bicarbonate and 95.2 grams of a 10% solution of the tetra sodium salt of ethylene diamine tetraacetic acid available from Dow Chemical as Versene 100. The reactor was sealed and tested for leaks at 30° C. The reactor was purged of oxygen by pressurizing with nitrogen to about 60 psig and then evacuating the nitrogen to a vacuum of about 150 millimeters of mercury. The process of pressurizing the reactor with nitrogen and evacuating was performed a total of three times.

After purging, 2.17 kilograms of acrylonitrile were added to the reactor. Immediately after the addition of the acrylonitrile, 22.4 kilograms of the following monomer mixture were added to the reactor: 7.29 kilograms styrene, 446 grams of normal octyl mercaptan, 3.123 kilograms of acrylonitrile and 138.3 kilograms of butadiene. After introducing 22.4 kilograms of this mixture into the reactor, an initiator shot was added comprising 4,462 grams of deionized water and 297.5 grams sodium persulfate.

The temperature of the reactor was increased to approximately 65° C. over a period of about one-half hour. A pressure drop of about 10 psi indicated initiation of the polymerization reaction. At this time, the remainder of the monomer mixture described about was continuously added to the reactor at a rate of about approximately 25.4 kilograms per hour. At the same time the monomer mixture was being continuously added to the reactor, an aqueous mixture was also being added at a rate of about 7.5 kilograms per hour. The aqueous mixture comprised 27 kilograms of deionized water and 10.4 kilograms of a 43% solution of sodium dodecylbenzenesulfonate.

The reaction was allowed to continue until the pressure within the reactor decreased to about 20 psig. At this time, the contents of the reactor were steam stripped to remove the unreacted monomer.

Sample 4

386 kilograms of a latex based on the aforesaid substrate rubber at about 35% solids was charged into a 200 gallon glass-lined reactor. The reactor was pressurized with nitrogen to 10 psig, then heated to 70° C. To this was added 82 kilograms per hour of an agglomerating mixture for a period of 0.667 hours. The agglomerating mixture comprised approximately 51 kilograms of deionized water, 3.6 kilograms of an agglomerating latex blend (at 28% solids by weight) and 0.7 kilograms of the surfactant sodium dodecylbenzenesulfonate (43% solution). The agglomerating latex used in this blend comprises a methacrylic acid-ethylacrylate copolymer (1:11.5 by weight) shell with a rubber core prepared as disclosed in U.S. Pat. No. 4,419,496, entitled PARTICLE AGGLOMERATION IN RUBBER LATICIES, issued on Dec. 6, 1983, to David E. Henton et al.

Following this agglomeration step, the following monomer mixture was continuously added to the reactor at a rate of 20.9 kilograms per hour for two hours:
Styrene—71.75% by weight
Acrylonitrile—27.90% by weight
Normal octyl mercaptan—0.35% by weight
Simultaneously, the following aqueous mixture was continuously added at a rate of approximately 20.1 kilograms per hour for two hours:
Demineralized water—93.28% by weight
Sodium persulfate—0.25% by weight
Sodium dodecylbenzenesulfonate—6.47% by weight (of a 43% solids solution)

At this time, two gallons of the reaction mixture were removed and were steam stripped to remove the unreacted monomer. The resulting graft rubber concentrate comprised 77.2% rubber.

Sample 5

To prepare sample 5, the grafting monomer continuous addition and the associated aqueous continuous addition described for sample 4 were continued for another three hours, to a total of five hours. Again, two gallons of the reaction mix were removed and steam stripped. The resulting graft rubber concentrate comprised 53.0% rubber.

Sample 6

Sample 6 was prepared by continuing the above monomer and aqueous con-ads another hour, to a total of six hours. As above, two gallons were then removed from the reactor and steam stripped. The resulting graft rubber concentrate comprised 49.0% rubber.

Sample 7

Sample 7 was prepared by continuing the above monomer and aqueous con-ads for another hour to a total of seven hours. Two more gallons were removed and steam stripped. The resulting graft rubber concentrate comprised 47% rubber.

Sample 8

The graft rubber concentrate of sample 8 was prepared in the same manner as sample 4, except that only half as much sodium persulfate was used in the aqueous continuous addition mixture which is added along with the grafting monomer mixture. Also, the continuous addition of those mixtures was carried on for three and one-half hours instead of two hours. The result was a graft rubber concentrate having a rubber content of 64%.

Sample 9

For this sample, a 200 gallon glass-lined jacketed reactor was charged with 97.6 kilograms deionized water, 805 grams sodium persulfate, 894 grams sodium bicarbonate, 268 grams sodium hydroxide beads, 9.83 kilograms of the soap master batch solution (detailed below) and 120 grams of a 10% solution of Versene 100 (tetra sodium salt of ethylene diamine tetraacetic acid). The reactor was purged of oxygen by pressurizing with nitrogen to about 60 psig and then evacuating the nitrogen to a vacuum of about 150 millimeters of mercury. This was repeated three times.

After purging the reactor of oxygen the following monomer mixture was then added to the reactor:

Styrene—12.5 kilograms
Acrylonitrile—5.4 kilograms
Tertiary dodecyl mercaptan—0.45 kilograms
Butadiene—160.9 kilograms The temperature of the reactor was then increased to approximately 65° C. over a period of about one-half hour.

After approximately 10 hours, 14.3 kilograms of the following soap master batch solution was added to the reactor:

| Item | % of Total, by weight |
|---|---|
| Dresinate 214[1] | |
| (of 75% solids solution) | 9.14% |
| Caustic | 0.085% |
| Deionized Water | 87.83% |
| Sodium Oleate | 2.94% |

[1]Dresinate 214 (a product of Hercules, Inc.) comprises rosin soap (potassium salt of abietic acid).

After the reactor pressure fell to 85 psig, the following continuous addition was initiated at a rate of approximately 28.7 kilograms per hour for approximately four hours:

The surfactant solution described

| The surfactant solution described above | 20.6 kilograms |
|---|---|
| Deionized Water | 266.3 kilograms |
| Sodium Persulfate | 214 grams |

The temperature in the reactor was increased to 80° C. until the reactor pressure fell to approximately 50 psig, at which time the reaction was treated as complete. The contents of the reactor were steam stripped to remove the unreacted monomer. The resulting 100% rubber constitutes sample 9 of Example 2 above.

CONCLUSION

The product of the examples is an ABS graft rubber polymer (except sample 9 which is nongrafted). Other modified rubber concentrates can also be produced within the scope of the present invention. Further, the emulsion which has to be coagulated and de-watered might be, in the broader aspects of the invention, the result of straightforward emulsion preparation or blending without utilizing a polymerization step. While the invention is perhaps most applicable where the emulsion is the result of an emulsion polymerization graft, the claims should not be construed to rule out the possibility of the creation of the emulsion in other ways, unless specifically so limited by their language.

It will be understood and appreciated that various other changes and alterations can be made without departing from the spirit and broader aspects of the invention as set forth in the appended claims.

The embodiments of the invention in which an exclusive property or privilege is claimed are defined as follows:

1. A method for producing a de-watered modified rubber concentrate comprising a graft rubber made from a process including the peparation of a latex emulsion of the modified rubber concentrate wherein the improvement comprises:

insuring that the rubber content of the emulsified modified rubber concentrate is from about 57 to about 88% by weight of the rubber concentrate itself;

freeze coagulating the modified rubber concentrate from the emulsion to create a readily de-waterable modified rubber concentrate without the addition of organic liquids either simultaneously with or after freeze coagulation and prior to de-watering; and mechanically de-watering the freeze coagulated modified rubber concentrate.

2. The method of claim 1 in which the rubber of the rubber concentrate is an elastomer having a glass transition temperature no greater than about −20° C.

3. The method of claim 2 in which said step of insuring that the modified rubber concentrate in the emulsion has a rubber content of between about 57 and about 88% by weight comprises forming the modified rubber concentrate by emulsion polymerization to a rubber content of between about 57 and about 88% by weight.

4. The method of claim 2 in which said step of insuring that the modified rubber concentrate in the emulsion has a rubber content of between about 57 and about 88% by weight comprises blending at least two polymer emulsions to a final rubber content of between about 57 and about 88% by weight of the total modified rubber concentrate polymer.

5. The method of claim 2 in which the modified rubber concentrate comprises an acrylonitrile-butadiene-styrene copolymer.

6. The method of claim 1 in which said step of insuring that the modified rubber concentrate in the emulsion has a rubber content of between about 57 and about 88% by weight comprises forming the modified rubber concentrate by emulsion polymerization to a rubber content of between about 57 and about 88% by weight.

7. The method of claim 6 in which said rubber content is between about 64% and about 80% by weight.

8. The method of claim 1 in which said step of insuring that the modified rubber concentrate in the emulsion has a rubber content of between about 57 and about 88% by weight comprises blending at least two polymer emulsions to a final rubber content of between about 57 and about 88% by weight of the total modified rubber concentrate polymer.

9. The method of claim 8 in which said rubber content is between about 64% and about 80% by weight.

10. The method of claim 1 in which the modified rubber concentrate comprises an acrylonitrile-butadiene-styrene copolymer.

11. The method of claim 10 in which said rubber content is between about 64% and about 80% by weight.

12. The method of claim 1 in which said rubber content is between about 64% and about 80% by weight.

* * * * *